Sept. 9, 1952  F. LAMBERT, JR., ET AL  2,610,017
VIBRATION ISOLATOR
Filed May 19, 1948
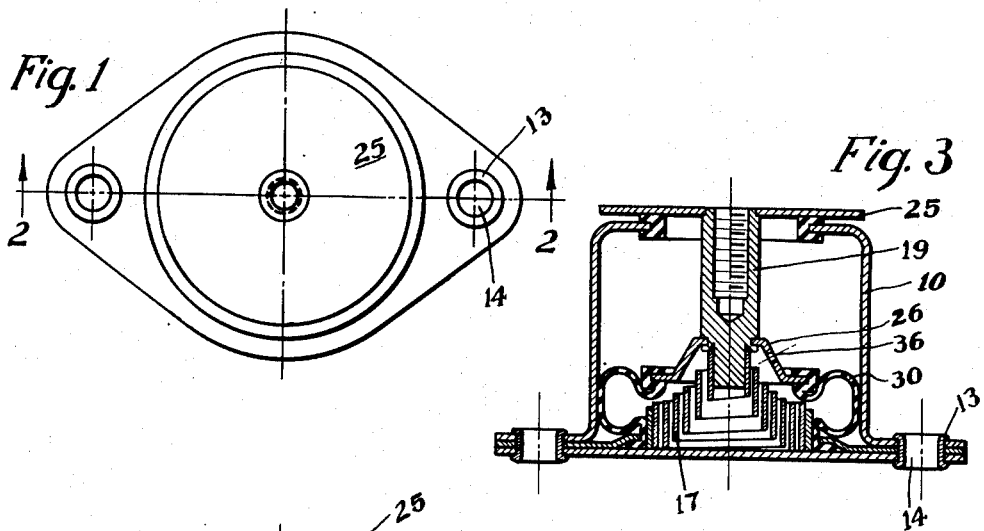
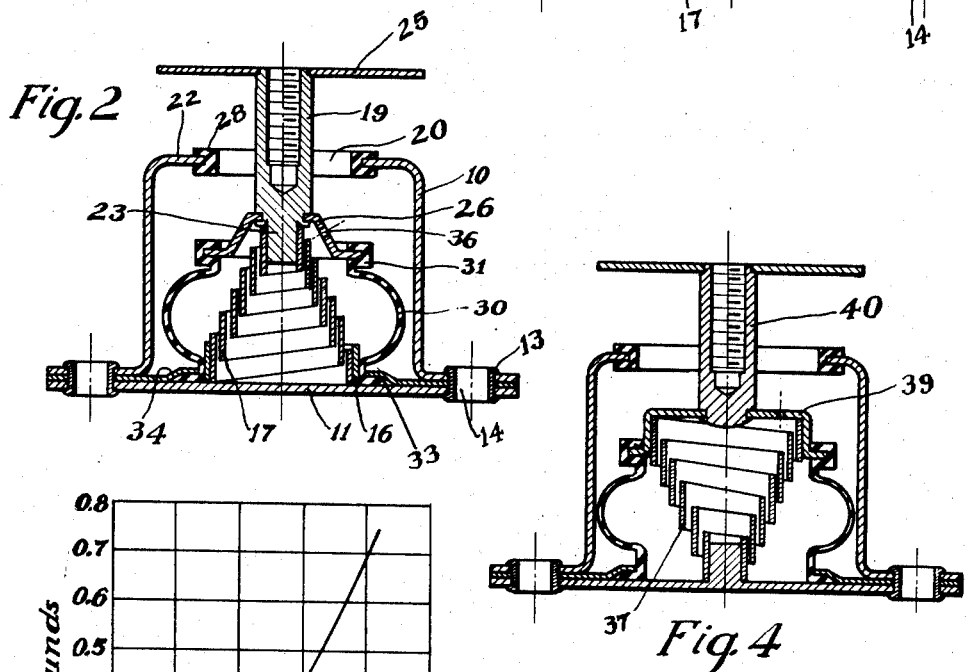
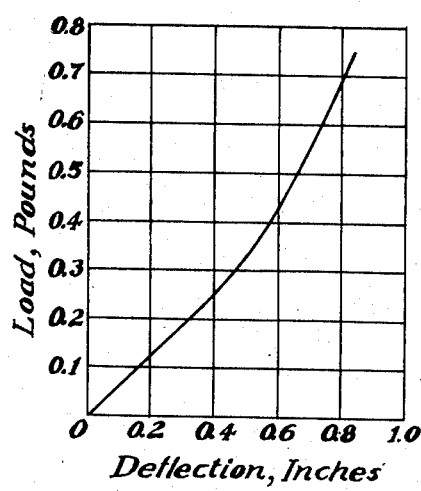
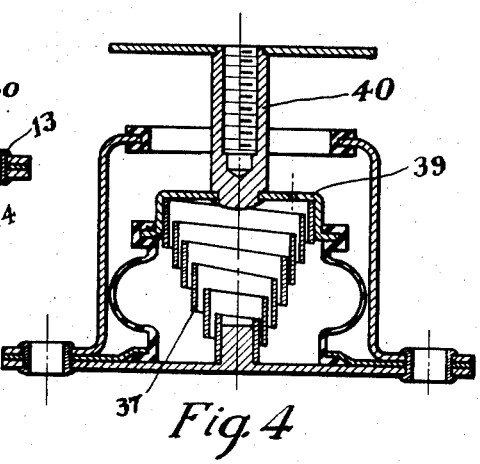
Inventors:
Frank Lambert
Charles E. Crede
Agent Patented Sept. 9, 1952

2,610,017

UNITED STATES PATENT OFFICE 2,610,017

VIBRATION ISOLATOR

Frank Lambert, Jr., Lexington, and Charles E. Crede, Winchester, Mass., assignors to The Barry Corporation, a corporation of Massachusetts Application May 19, 1948, Serial No. 27,948

3 Claims. (Cl. 248—358)

Our invention relates to means for mounting delicate equipment, particularly in airplanes, to isolate such equipment from any vibration which may exist at the supporting structure. Vibration isolators, in general, are well known and may be described briefly as a resilient means for supporting the equipment. It may be determined from the theory of vibration isolation that it is required that the natural frequency of the equipment upon the isolators must be substantially lower than the frequency of the vibration which is to be isolated.

An equipment mounted upon resilient mounts has a natural frequency, and the motion of the equipment may become excessively large at resonance; i. e., when the vibration to be isolated occurs at the natural frequency of the equipment upon the isolators. It is an object of our invention, therefore, to provide a vibration isolator with a large damping capacity in order to prevent excessive excursion of the mounted equipment when operating at or near its resonant frequency.

Another object of our invention is to provide a vibration isolator whose natural frequency remains constant independently of the load applied to the isolator. This is advantageous when the weight or weight distribution of the mounted equipment has not been accurately predetermined or when it varies from time to time.

A further object of our invention is to provide a vibration isolator which will remain operative at extremely high and low temperatures. This requires the use of a resilient load-supporting element which remains operative throughout a wide temperature range and damping means which provides adequate damping at all temperatures.

Other objects and advantages of our invention will become apparent from the following detailed description and accompanying drawings in which:

Figure 1 is a plan view of the isolator.

Figure 2 is a section on line 2—2 of Figure 1 showing the isolator in a position of mean deflection.

Figure 3 is a view similar to Figure 2 showing the isolator in a position of greatest deflection.

Figure 4 is a view similar to Figure 2 showing the load-carrying spring in an inverted position.

Figure 5 is a load-deflection curve for a spring whose natural frequency remains constant at 5 cycles per second independently of load from 0.25 to 0.75 lb.

As illustrated in Figures 1 and 2, the isolator includes an outer retaining cup 10 and a base plate 11 attached together by means of eyelets 13 which embody central holes 14 for attachment of the isolator to a supporting structure. A shallow positioning cylinder 16 is attached to the base plate 11 at its center. A volute spring 17 is supported by the base plate 11 and nests within the positioning cylinder 16. A central core 19 extends downwardly through the opening 20 in the top wall 22 of the retaining cup 10 and has a pilot 23 which nests in the upper coil of the volute spring 27. The core 19 has rigidly attached thereto a flat upper washer 25 and a dome-shaped lower washer 26. The opening 20 in the upper wall of the retaining cup 11 is encircled by a rubber grommet 28 attached to the retaining cup 10. The central core 19 is tapped for attachment of the mounted equipment. The upper (25) and lower (26) washers are larger than the opening 20 in the retaining cup so that the mounted equipment is made captive; that is, it cannot escape from the supporting structure in the event of failure of the resilient parts of the isolator.

The volute spring 17 is positioned within an enclosure formed preferably by a thin-walled, sphere-like member 30 made from rubber or other resilient material. A boot 31 which surrounds and forms a part of the upper rim of the sphere-like member 30 fits around the periphery of the lower washer 26 and forms an airtight connection therewith. An integral peripheral flange 33 at the lower edge of the resilient member 30 is held in contact with the base plate 11 by a clamp plate 34 interposed between the outer retaining cup 10 and the base plate 11 and held in position by the eyelets 13. The spring 17 is thus contained within a flexible enclosure which is airtight except for a small aperture 36 in the lower washer 26.

As the isolator is deflected downwardly from the position shown in Figure 2 to the position shown in Figure 3, the volume contained within the rubber member 30 is decreased. Some of the air within the enclosure is thus expelled through the aperture 36. In a similar manner, when the isolator is deflected upwardly, the volume within the rubber member 30 is increased and air is drawn inwardly through the aperture 36. The force applied to the mount is used partly to deflect the spring 17 and partly to expel the air through the aperture 36. The energy used to deflect the spring is stored in the spring and returned to the mounted body when the spring is restored to its initial length. The energy used to expel the air from the enclosure becomes lost, however, and is not returned to the mounted equipment when the isolator is restored to its initial position. This loss of energy functions to limit the amplitude of vibration of the mounted equipment when operating at its resonant frequency.

The natural frequency of a body supported by a resilient element depends upon the relation existing between the stiffness of the resilient element and the mass of the supported body. If the stiffness of the resilient element is constant, independently of deflection, the natural frequency of the system decreases as the mass of the mounted body increases. The frequency can be maintained constant, however, if the stiffness increases proportionately to the applied load. The load-deflection curve shown in Figure 5 illustrates the required characteristics in order to maintain the natural frequency constant at 5 C. P. S. for any load between 0.25 lbs. and 0.75 lbs. In a volute spring, the outer coils are more flexible because they are coils of larger diameter. When these outer coils become inactive, the stiffness of the spring increases because the remaining active coils are fewer in number and smaller in diameter. The volute spring, therefore, has a stiffness which increases with load because the outer coils successively bottom upon the supporting surface and become inactive as the deflection increases. By proper choice of the radii of the various coils and the helix angle which determines the rate at which the height of the spring increases, a spring may be designed with the characteristics shown in Figure 5. These characteristics are desirable where the exact load on each isolator has not been predetermined or where the weight distribution of the mounted body changes from time to time.

Figure 4 shows a modified form of the isolator in which the volute spring 37 is arranged with its larger coils at the top. As deflection of the isolator takes place, the larger diameter coils bottom upon the washer 39 which is attached to the central core 40.

The accompanying drawings illustrate the preferred form of the invention, although it is to be understood that the invention is not limited to the exact details of construction shown and described, as it is obvious that various modifications thereof, within the scope of the claims, will occur to persons skilled in the art.

I claim:

1. A vibration isolator comprising a main resilient member for carrying the load and an enclosure member for said main resilient member forming a chamber about it, said enclosure member having a resilient side wall which is symmetrical with respect to the vertical axis of the main resilient member and which is spaced outwardly a substantial distance from the main resilient member throughout substantially its entire length, said enclosure member being substantially impervious to air except for a relatively small aperture, whereby air is caused to flow through said aperture upon deflection of said main resilient member and thereby causes damping to prevent excessive excursion of the mounted equipment without frictional engagement between said outwardly spaced side wall of the enclosure member and the main resilient member.

2. A vibration isolator comprising a main resilient member for carrying the load and an enclosure member for said main resilient member forming a chamber about it, said enclosure member having a resilient side wall which is symmetrical with respect to the vertical axis of the main resilient member, which is spaced outwardly a substantial distance from the main resilient member throughout substantially its entire length and which is provided with an outwardly convex portion intermediate its ends, said enclosure member being substantially impervious to air except for a relatively small aperture, whereby upon deflection of said main resilient member said outwardly convex portion of the side wall of the enclosure member is also deflected and air is caused to flow through said aperture, thereby causing damping to prevent excessive excursion of the mounted equipment without frictional engagement between said outwardly spaced side wall of the enclosure member and the main resilient member.

3. A vibration isolator comprising a main resilient member for carrying the load, an enclosure member for said main resilient member having a resilient side wall and a rigid top wall and forming a chamber about the main resilient member, said side wall being symmetrical with respect to the vertical axis of the main resilient member and spaced outwardly a substantial distance from the main resilient member throughout substantially its entire length, the upper end of said enclosure side wall being attached to said rigid top wall, a mounting stud attached to said top wall and being adapted to transmit the load to the upper end of the main resilient member, said enclosure member being substantially impervious to air, said top wall having a relatively small aperture, whereby air is caused to flow through said aperture upon deflection of said main resilient member and thereby causes damping to prevent excessive excursion of the mounted equipment without frictional engagement between said outwardly spaced side wall of the enclosure member and the main resilient member.

FRANK LAMBERT, Jr.
CHARLES E. CREDE.

REFERENCES CITED

The following references are of record in the file of this patent:

UNITED STATES PATENTS

| Number | Name | Date |
|---|---|---|
| 943,709 | Sherwood | Dec. 21, 1909 |
| 2,175,405 | Meredith et al. | Oct. 10, 1939 |
| 2,425,565 | Robinson | Aug. 12, 1947 |

FOREIGN PATENTS

| Number | Country | Date |
|---|---|---|
| 511,737 | Great Britain | Aug. 23, 1939 |
| 541,416 | Germany | Dec. 17, 1931 |